(12) United States Patent
Breedvelt et al.

(10) Patent No.: US 12,204,601 B2
(45) Date of Patent: Jan. 21, 2025

(54) CROSS-INFORMATION ARCHITECTURE HISTORICAL BREADCRUMB CONTROL

(71) Applicant: INTERNATIONAL BUSINESS MACHINES CORPORATION, Armonk, NY (US)

(72) Inventors: Ilse Breedvelt, Manotick (CA); Cameron Edward Calder, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/052,733

(22) Filed: Nov. 4, 2022

(65) Prior Publication Data
US 2024/0152566 A1    May 9, 2024

(51) Int. Cl.
*G06F 16/954* (2019.01)

(52) U.S. Cl.
CPC .................. *G06F 16/954* (2019.01)

(58) Field of Classification Search
CPC ........................................ G06F 3/0482
See application file for complete search history.

(56) References Cited

U.S. PATENT DOCUMENTS

| | | | |
|---|---|---|---|
| 7,818,683 B2 | 10/2010 | Sorin | |
| 9,959,358 B2 | 5/2018 | Lam | |
| 2008/0282199 A1 | 11/2008 | Gherardi | |
| 2009/0063547 A1* | 3/2009 | Wright | G06F 16/904 707/999.102 |
| 2014/0075364 A1* | 3/2014 | Bragdon | G06F 8/33 715/772 |
| 2014/0189519 A1* | 7/2014 | Powell | H04L 67/535 715/736 |
| 2014/0258875 A1* | 9/2014 | Somerfield | G06F 16/955 715/738 |
| 2014/0359489 A1* | 12/2014 | Zhao | G06F 3/0482 715/760 |
| 2016/0162591 A1* | 6/2016 | Dokania | G06F 3/04842 707/738 |
| 2017/0060375 A1* | 3/2017 | Kondo | G06F 3/0488 |
| 2020/0021482 A1* | 1/2020 | Lo | H04L 43/067 |
| 2020/0104403 A1* | 4/2020 | Agarwal | G06F 16/951 |

(Continued)

OTHER PUBLICATIONS

Brooks, et al., "Hoptrees: Branching History Navigation for Hierarchies", IFIP International Federation for Information Processing, 2013, pp. 316-333. https://link.springer.com/content/pdf/10.1007%2F978-3-642-40477-1_20.pdf.

(Continued)

*Primary Examiner* — Di Xiao
(74) *Attorney, Agent, or Firm* — Rakesh Roy

(57) ABSTRACT

A method, computer system, and a computer program product for cross-information architecture (IA) historical breadcrumb control is provided. The present invention may include generating a historical breadcrumb control on a user device. The present invention may also include rendering a list of breadcrumb trails in the generated historical breadcrumb control in a temporal order, wherein each breadcrumb trail in the rendered list of breadcrumb trails represents a page location path of an IA accessed by a user.

16 Claims, 8 Drawing Sheets

(56) References Cited

U.S. PATENT DOCUMENTS

2022/0206670 A1    6/2022   Kotelnikova

OTHER PUBLICATIONS

Disclosed Anonymously, "A method for quickly and readily browsing historical resource by its context and hierarchy", IP.com, IPCOM000242503D, Jul. 21, 2015, 9 Pages.

Unknown, "Historical navigation", AtomSphere, [Accessed on Sep. 14, 2022], 6 Pages. https://help.boomi.com/bundle/flow/page/c-flo-Nav_Historical.html.

\* cited by examiner

300

STATE 302 (TABLE 1)

STATE 304 (TABLE 2)

STATE 310 (TABLE 5)

STATE 312 (TABLE 6)

STATE 314 (TABLE 7)

STATE 316 (TABLE 8)

CROSS-INFORMATION ARCHITECTURE HISTORICAL BREADCRUMB CONTROL

BACKGROUND

The present invention relates generally to the field of computing, and more particularly to navigating the information architecture (IA) of datasets.

Various software products may employ graphical navigation mechanisms, such as breadcrumb trails, to enable users to navigate the IA of a dataset to access electronic content and other software functionality. However, existing breadcrumb trails do not provide sufficient usability for interacting with increasingly complex IA structures of multiple datasets.

SUMMARY

Embodiments of the present invention disclose a method, computer system, and a computer program product for cross-information architecture (IA) historical breadcrumb control. The present invention may include generating a historical breadcrumb control on a user device. The present invention may also include rendering a list of breadcrumb trails in the generated historical breadcrumb control in a temporal order, wherein each breadcrumb trail in the rendered list of breadcrumb trails represents a page location path of an IA accessed by a user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
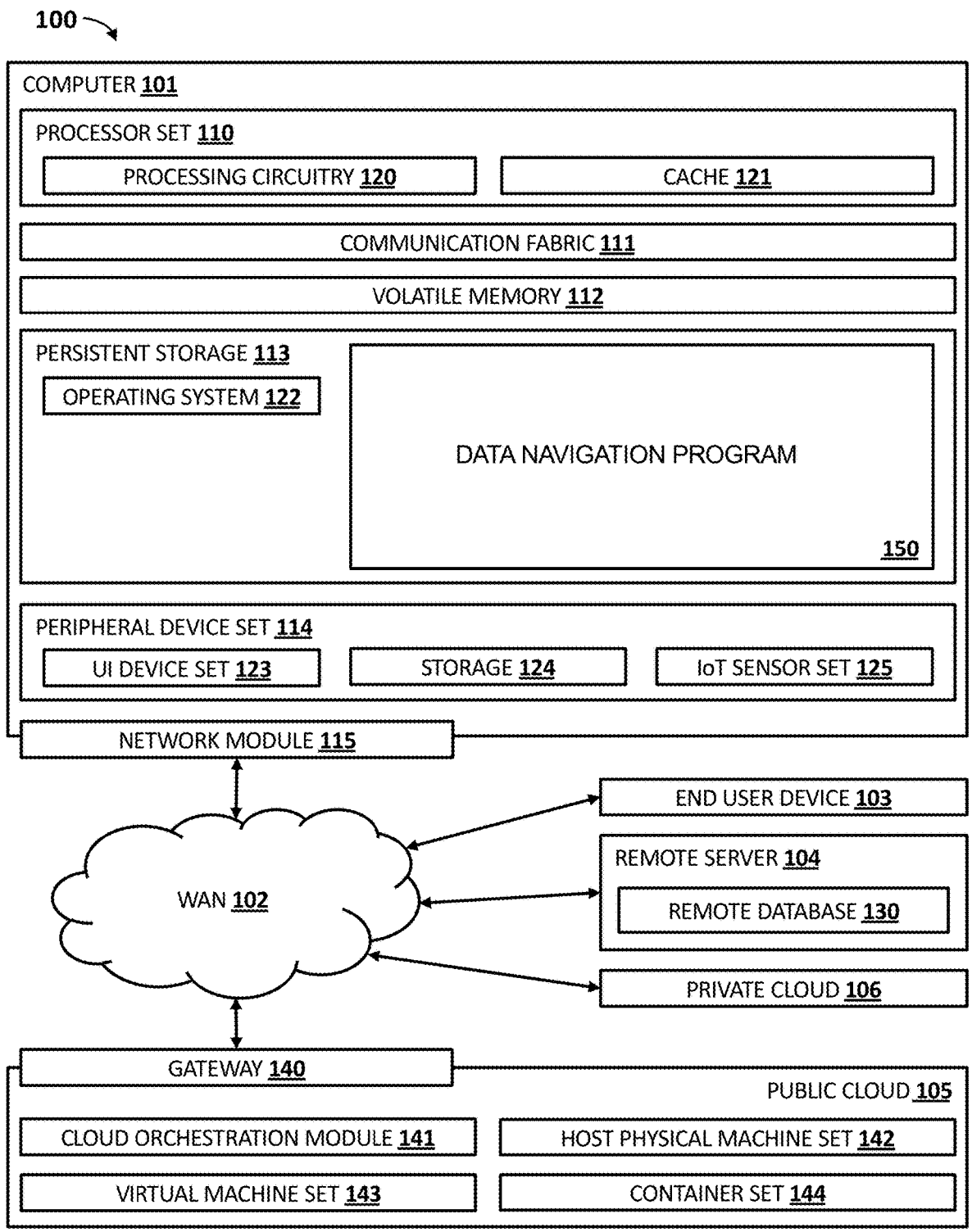
FIG. 1 illustrates a networked computing environment according to at least one embodiment.

The following described exemplary embodiments provide a system, method, and computer program product for an information architecture (IA) breadcrumb and history control. As such, the present embodiment has the capacity to improve the technical field of graphical user interface (GUI) navigation by enabling a user to traverse through the IA of a dataset and return to previously visited pages in the IA using a compact breadcrumb-history control. The present embodiment also has the capacity to improve the technical field of GUIs by enabling a user to traverse through multiple IAs and return to previously visited pages in different IAs using a compact breadcrumb-history control. More specifically, embodiments of a data navigation program may generate and display a breadcrumb-history interface on a user device. Embodiments of the data navigation program may render a list of breadcrumb trails in the generated and displayed breadcrumb-history interface in a temporal order. Embodiments of the data navigation program may enable each breadcrumb trail in the rendered list of breadcrumb trails to represent a page location path of an IA accessed by a user.

According to one embodiment, IA may be defined as the synthesis of organization, labeling, search, and navigation systems. As described previously, various software products may employ graphical navigation mechanisms, such as breadcrumb trails, to enable users to navigate the IA of a dataset to access electronic content and other software functionality. Examples of such applications may include web browsers for navigating websites, file system explorers for browsing folders and files, and database management systems for navigating the structures of a database.

In one embodiment, a breadcrumb trail may display a user's current location relative to the IA and enable the user to quickly navigate up to a higher-level (e.g., parent level) in the IA. The breadcrumb trail may represent this relationship by displaying a linear progression of pages in an IA page location path from a highest level (e.g., root node) of the IA to the user's current location in the IA. If the user browses content within the same page location path, following a series of linear steps through the page location path, the breadcrumb trail may seem to reflect the historic of steps taken by the user, even though the breadcrumb trail may only be reflecting the hard-coded IA hierarchy of the dataset. However, if the user follows a non-linear series of steps through the IA, for example, by selecting a new page that is linked to a different page location path in the IA, a new breadcrumb trail may replace the existing breadcrumb trail. The new breadcrumb trail may no longer reflect the historic steps taken by the user to the new content, and as a result, a part of the user's browsing history may become inaccessible.

However, existing breadcrumb trails do not provide sufficient usability for interacting with increasingly complex IA hierarchies of large datasets and the user's browsing history of the IA. In other words, a user is unable to navigate the IA and browsing history at the same time. Further, there are no existing solutions that enable the user to navigate the user's browsing history across multiple IA hierarchies associated with multiple applications.

Therefore, it may be advantageous to, among other things, provide a user-friendly mechanism for exploring multiple IAs as well as locating previously viewed content in the multiple IAs. It may be advantageous to provide compact overview of the multiple breadcrumb trails of an IA and the pages visited within those multiple breadcrumb trails. It may be advantageous to combine the IA hierarchy with the most important aspects of history tracking: recently visited pages. It may be advantageous to enable users to navigate "back" as well as navigate "up" to a location in IA hierarchy, even without having visited that location before.

Embodiments of the present disclosure may provide a compact historical breadcrumb control that lists visited breadcrumb trails to reflect the user's browsing history across multiple IA page location paths. The list of breadcrumb trails may display a page location path to the user's current location in the IA as well as the page location paths to the user's previously visited locations in the IA. The list of breadcrumb trails may be displayed in a temporal order, which may dynamically change to indicate the user's browsing history.

According to one embodiment, a user may navigate to a page in an IA (e.g., IA page location). In one embodiment, a system may capture the IA page location path and render the path as a breadcrumb. In one embodiment, each higher-level path may include a navigable hyperlink. In one embodiment, the last page in the breadcrumb may not include a navigable hyperlink. In one embodiment, if the user continues navigating down or up the same IA page location path (e.g., within the same parent-child chain of the IA), the system may continue displaying the associated path as a single breadcrumb line. In one embodiment, when the user navigates to a page outside of the first IA Page location path, the system may add a new IA page location path to the top of the history and render the new path as a new breadcrumb at the top of the recent list. In one embodiment, the system may bring the old IA page location path down in the list. In one embodiment, the system may keep the originally rendered breadcrumb as is, but make the last page as a navigable hyperlink to enable navigation back.

According to one embodiment, when a user returns to a previously visited "higher-level" node of an IA page location path, the system may move the shorter breadcrumb to the top and keep the longer breadcrumb in the history list, in the initial ranking order. In one embodiment, if a path is partially revisited (e.g., an in-between page), and the user navigates to another page, the breadcrumb in the history list may collapse into a single breadcrumb again. In one embodiment, any part of an IA that is repeated in the breadcrumb may be omitted in the list of breadcrumb trails in the historical breadcrumb control.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 according to at least one embodiment is depicted. Computing environment 100 contains an example of an environment for the execution of at least some of the computer code involved in performing the inventive methods, such as data navigation program 150. In addition to data navigation program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data navigation program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, data navigation program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The data navigation program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth—based trademarks and logos are trademarks or registered trademarks of Bluetooth SIG, Inc. and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user using any combination of an EUD 103, remote server 104, public cloud 105, and private cloud 106 may use the data navigation program 150 to navigate to previously visited pages and traverse through different IAs using a compact historical breadcrumb control. Embodiments of the present disclosure are explained in more detail below with respect to FIGS. 2 to 8.

Figure 2:
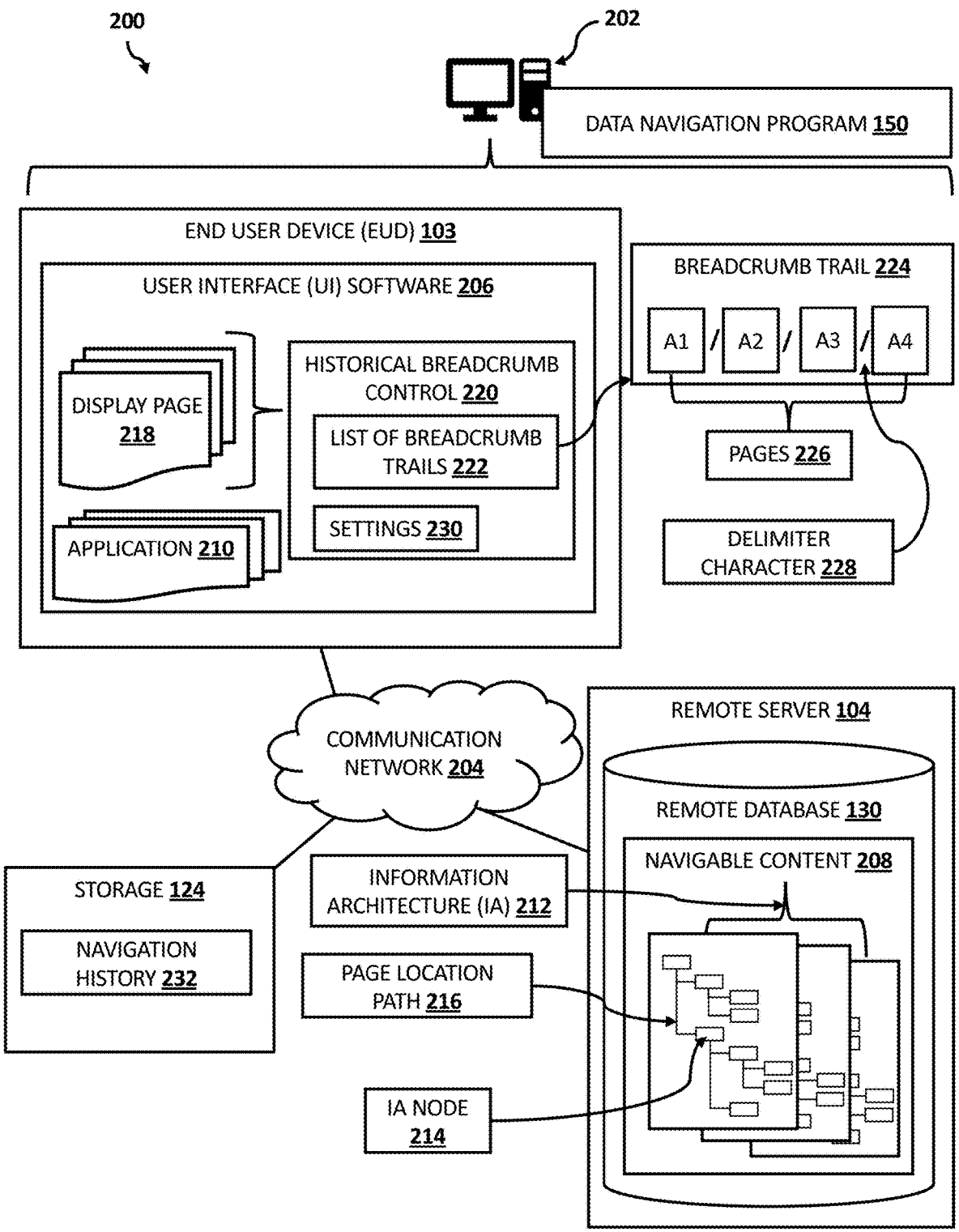
FIG. 2 is a schematic block diagram of a data navigation environment according to at least one embodiment.

Referring now to FIG. 2, a schematic block diagram of a data navigation environment 200 according to at least one embodiment is depicted. According to one embodiment, the data navigation environment 200 may include a computer system 202 having a tangible storage device and a processor that is enabled to run the data navigation program 150.

Generally, the data navigation program 150 may enable the computer system 202 to generate and display a single compact breadcrumb-history control (e.g., GUI) that combines breadcrumb trails with aspects of browsing history. More specifically, embodiments of a data navigation program 150 may render a list of breadcrumb trails associated with a user's browsing history of traversing one or more IAs. Embodiments of the data navigation program 150 may dynamically add, remove, and/or reorder breadcrumb trails in the list of breadcrumb trails to reflect the user's browsing history. For example, the data navigation program 150 may retain a breadcrumb trail at the top of the list of breadcrumb trails when a user navigates "up" to a page (e.g., to a parent/grandparent level page) in the same breadcrumb trail. Embodiments of the data navigation program 150 may render the last visited page (e.g., currently accessed page) differently from the other available pages in the same breadcrumb trail. If a user visits any of the pages in a previously accessed breadcrumb trail, embodiments of the data navigation program 150 may dynamically move that previously accessed breadcrumb trail that is currently accessed again to the top of the list of breadcrumb trails (and remove it from the lower position). Embodiments of the data navigation program 150 may enable navigation to a previously unvisited parent level page (e.g., higher-level page) of a previously visited breadcrumb trail in the list of breadcrumb trails.

According to one embodiment, the computer system 202 may include one or more components (e.g., computer 101; end user device (EUD) 103; WAN 102; remote server 104; remote database 130; storage 124) of the computer environment 100 described above with reference to FIG. 1. In one embodiment, the computer system 202 may include one or more computers (e.g., computer 101; EUD 103; remote server 104) which may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, and/or querying a database.

In at least one embodiment, aspects of the computer system 202 may operate in a cloud computing service model, such as Software as a Service (SaaS), Platform as a Service (PaaS), or Infrastructure as a Service (IaaS). In one embodiment, the computer system 202 may also be implemented as a cloud computing deployment model, such as a private cloud, community cloud, public cloud, or hybrid cloud.

In one embodiment, the data navigation program 150 may include a single computer program or multiple program modules or sets of instructions being executed by the processor of the computer system 202 (e.g., EUD 103, remote server 104). In one embodiment, the data navigation program 150 may include routines, objects, components, units, logic, data structures, and actions that may perform particular tasks or implement particular abstract data types. In one embodiment, the data navigation program 150 may be practiced in distributed cloud computing environments where tasks may be performed by local and/or remote processing devices which may be linked through a communication network 204. In at least one embodiment, the data navigation program 150 may be executed on a single computing device (e.g., EUD 103).

According to one embodiment, the EUD 103, remote server 104 (including remote database 130), and storage 124 may be communicatively coupled via the communication network 204. The communication network 204 may include various types of communication networks, such as the wide area network (WAN) 102, described with reference to FIG. 1. In some embodiments, the WAN may be replaced and/or supplemented by a local area network (LAN), a telecommunication network (e.g., 3G, 4G, 5G), a wireless network, a public switched network and/or a satellite network. In one embodiment, the communication network 204 may enable data to be transferred between the EUD 103, remote server 104 (including remote database 130), and storage 124 using short-range wireless technologies, such as, for example, Wi-Fi and/or Bluetooth® (Bluetooth and all Bluetooth—based trademarks and logos are trademarks or registered trademarks of Bluetooth SIG, Inc. and/or its affiliates).

According to one embodiment, the EUD 103 may include a user interface (UI) software 206 which may be used to access (e.g., via communication network 204) one or more navigable content 208 stored in the remote database 130 of the remote server 104. In one embodiment, the UI software 206 may include web browsers, file system explorers, and database management systems, and/or any other application that may be used to access the navigable content 208. In at least one embodiment, the UI software 206 may include a platform that enables users to interact with one or more applications 210 on a single control plane (e.g., UI).

According to one embodiment, navigable content 208 may include websites, webpages, folders, files, documents, data objects, and/or any other electronic content which may be accessed via the UI software 206. According to one embodiment, the navigable content 208 may include one or more datasets that may be organized to include an information architecture 212.

In one embodiment, each application 210 that may be accessed by the UI software 206 may include a corresponding IA 212. In one embodiment, the IA 212 may be implemented to organize the navigable content 208 of the corresponding application 210 in an effective way to enable users to find information and complete tasks using the UI software 206. In one embodiment, the IA 212 may include hierarchical organization having one or more IA nodes 214. According to one embodiment, each IA node 214 of the IA 212 may be associated with a page location path 216 leading from a root node of the IA 212 and may include one or more other nodes 214. IA nodes 214 in the same page location path 216 may include parent-child relationships. For example, an IA node 214 may be the child node (e.g., lower-level node) of the IA node 214 one level above it on the same page location path 216 and the parent node (e.g., higher-level node) of any IA nodes 214 one level below it on the same page location path 216. IA nodes 214 that are connected may be part of the same page location path 216, whereas IA nodes 214 that are not connected may be part of a different page location path 216.

According to one embodiment, an IA node 214 of the IA 212 may be associated with a corresponding display page 218 generated by the UI software 206. As such, each IA node 214 may be associated with the one or more contents (e.g., application page, website, webpage, folder, file, document, data object, and/or any other electronic content) of the navigable content 208 that may be displayed on the corresponding display page 218.

According to one embodiment, the UI software 206 may provide various software navigation techniques which may enable a user to provide input, view content, and navigate the navigable content 208 (e.g., IA 212) of the one or more applications 210. In one embodiment, the UI software 206 may generate one or more display pages 218 to display software-generated representations of the navigable content 208 on the EUD 103. In one embodiment, a user may interact with UI elements in one display page 218 (e.g., displaying a first application page, webpage, file, document, and/or any other electronic content) to transition to another display page (e.g., displaying a second application page, webpage, file, document, and/or any other electronic content).

According to one embodiment, the data navigation program 150 may display a historical breadcrumb control 220 as a UI element in one or more display page 218. In one embodiment, the historical breadcrumb control 220 may enable the user to navigate between different applications 210 and the corresponding IAs 212 and return to previously visited pages. In one embodiment, the data navigation program 150 renders a list of breadcrumb trails 222 in the historical breadcrumb control 220 based on the user's navigation history of one or more applications 210 using the UI software 206.

According to one embodiment, the list of breadcrumb trails 222 may include one or more breadcrumb trails 224 (e.g., configurable using settings control 230). In one embodiment, a breadcrumb trail 224 may complement a hierarchical tree structure of the corresponding IA 212 by showing a horizontal representation of the user's current location relative to the IA 212 and enable users to quickly move up to a parent level or previous step in the IA 212. In one embodiment, the breadcrumb trail 224 may include one or more pages 226 (e.g., page links, breadcrumbs) and any suitable delimiter character 228 (e.g., (>), (:), (/)) to separate pages 226 in the breadcrumb trail 224. Each page 226 between delimiter characters 228 may represent one step in the hierarchical tree structure of the corresponding IA 212. In one embodiment, each breadcrumb trail 224 may represent a page location path 216 of the corresponding IA 212. The breadcrumb trail 224 may start with the highest-level parent page (e.g., root node) of the IA 212 and move deeper into the IA 212 along the page location path 216 as the breadcrumb trail 224 progresses.

According to one embodiment, each page 226 in the breadcrumb trail 224 may contain a hyperlink, except the page 226 that is currently displayed in the UI software 206. When the page 226 is no longer currently displayed, the data navigation program 150 may reinstate the hyperlink associated with that page 226. In one embodiment, each page 226 having the hyperlink may link to the contents of a corresponding IA node 214 of the corresponding IA 212. In one embodiment, each page 226 having the hyperlink may link to a corresponding display page 218 to display the contents of the corresponding IA node 214 of the corresponding IA 212.

In one embodiment, the historical breadcrumb control 220 may include a settings control 230 to enable the user to select how many breadcrumb trails 224 (e.g., page location paths 216) to display in the list of breadcrumb trails 222 when the user drops down the historical breadcrumb control 220. In another embodiment, the settings control 230 may also enable the user to select how many pages 226 to display in each breadcrumb trail 224. In one embodiment, if the number of pages 226 in the breadcrumb trail 224 exceeds the number of pages selected in the settings control 230, the data navigation program 150 may implement an overflow menu to truncate the pages 226 between the first page 226 and the last page 226. In one embodiment, the remaining pages 226 may be accessed via the overflow menu.

According to one embodiment, as the user interacts one or more applications 210 using the UI software 206, the data navigation program 150 may capture and store a navigation history 232 in the storage 124. In one embodiment, the navigation history 232 may capture the temporal order in which the user interacts with the applications 210, IAs 212, page location paths 216, and IA nodes 214. In one embodiment, the data navigation program 150 may request and obtain the navigation history 232 to render the accessed page location paths 216 as the breadcrumb trails 224. In one embodiment, the data navigation program 150 may render the list of breadcrumb trails 222 in the displayed historical breadcrumb control 220 in a temporal order based on the navigation history 232 obtained from the storage 124. In one embodiment, the temporal order may include a reverse-chronological order where the list of breadcrumb trails 222 may be rendered to start with a most recently (e.g., newest) accessed breadcrumb trail 224 and continue down to a least recently (e.g., oldest) accessed breadcrumb trail 224. In at least one embodiment, the temporal order may include a chronological order where the list of breadcrumb trails 222 may be rendered to start with the oldest accessed breadcrumb trail 224 and continue down to the newest accessed breadcrumb trail 224. In one embodiment, the data navigation program 150 may dynamically change the list order of the breadcrumb trails 224 in the list of breadcrumb trails 222 based on the navigation history 232.

Referring now to FIGS. 3A to 3D, a schematic block diagram of exemplary data navigation states 300 implemented by the data navigation environment 200 (FIG. 2) according to at least one embodiment is depicted.

According to one embodiment, in state 302 (Table 1), a user may navigate to a Page A in an application using a UI software. In one example, Page A may represent a first IA node in a first page location path of a corresponding IA. An exemplary placement of the first IA node in the IA hierarchy is illustrated in column 2 of Table 1. In one embodiment, the data navigation program 150 may capture the first page location path of Page A and render the first page location path as a breadcrumb trail "Home>Page A". In one embodiment, the UI software may display "Home>Page A" as a visible breadcrumb trail in a corresponding display page (column 3, Table 1). In one embodiment, each higher-level page (e.g., relative to the current page) may include a navigable hyperlink (e.g., indicated by the underlined page name, a different color/font, or any suitable indicator) but the current page may not include a navigable hyperlink. In one embodiment, the visible breadcrumb trail may be placed in a top portion of the corresponding display page. In one embodiment, the visible breadcrumb trail may be placed above a page title in the corresponding display page. In one embodiment, the data navigation program 150 may include the breadcrumb trail "Home>Page A" in a top position of the list of breadcrumb trails in a historical breadcrumb control (column 4, Table 1). In one embodiment, the historical breadcrumb control may include a drop-down menu (e.g., overflow box) which may be selected by the user to display the list of breadcrumb trails. In one embodiment, the most recently accessed breadcrumb trail in the top position of the list of breadcrumb trails may be provided as the visible breadcrumb trail (e.g., breadcrumb trail "Home>Page A") above the drop-down menu (e.g., overflow box). In other embodiments, the most recently accessed breadcrumb trail in the top position of the list of breadcrumb trails may be provided as the visible breadcrumb trail above the drop-down menu as well as the breadcrumb trail at the top of the drop-down menu. In at least one embodiment, when the user interacts with the historical breadcrumb control to display the list of breadcrumb trails, the most recently accessed breadcrumb trail may be dynamically removed from the visible breadcrumb trail position above the drop-down menu and listed in the top position of the drop-down menu (e.g., within the overflow box).

According to one embodiment, in state 304 (Table 2), a user may navigate to a Page B in the application using the UI software. In one example, Page B may represent a second IA node in the same first page location path (relative to Page A) of the corresponding IA (e.g., within the same parent-child chain of the IA). An exemplary placement of the second IA node in the IA hierarchy is illustrated in column 2 of Table 2. In one embodiment, the data navigation program 150 may capture the first page location path of Page B and render the first page location path as a single breadcrumb trail "Home>Page A>Page B," where Page B is added. In one embodiment, the UI software may display "Home>Page A>Page B" as a visible breadcrumb trail in a corresponding display page (column 3, Table 1). In one embodiment, the list of breadcrumb trails in the historical breadcrumb control may display the single breadcrumb trail "Home>Page A>Page B." In one embodiment, each higher-level page (e.g., relative to the current page B) may include a navigable hyperlink (e.g., indicated by the underlined page name) but the current page B may not include a navigable hyperlink.

Figure 3A:
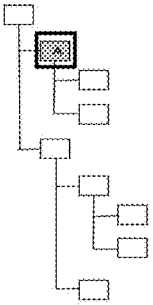
FIG. 3A is a schematic block diagram of a first set of exemplary data navigation states implemented by the data navigation environment according to at least one embodiment.
Figure 3A:
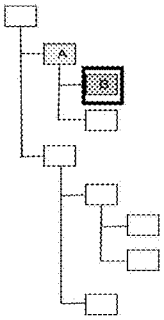
Figure 3B:
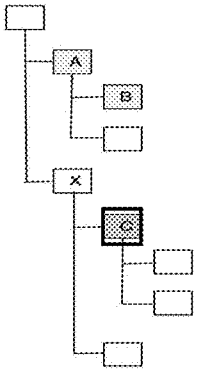
FIG. 3B is a schematic block diagram of a second set of exemplary data navigation states implemented by the data navigation environment according to at least one embodiment.
Figure 3B:
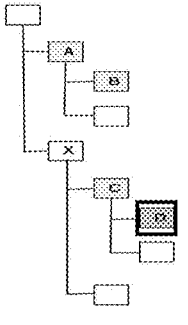

According to one embodiment as illustrated in FIG. 3B, in state 306 (Table 3), a user may navigate to a Page C in the application using the UI software. In one example, Page C may represent an IA node in a different page location path (relative to Page A and Page B) of the corresponding IA. An exemplary placement of the IA node associated with Page C in the IA hierarchy is illustrated in column 2 of Table 3. In one embodiment, the data navigation program 150 may capture the new page location path of Page C and render the new page location path as a new breadcrumb trail "Home>Page X>Page C". In one embodiment, the UI software may display "Home>Page X>Page C" as a visible breadcrumb trail in a corresponding display page (column 3, Table 3). In one embodiment, the list of breadcrumb trails in the historical breadcrumb control may display two breadcrumb trails, where "Home>Page X>Page C" may be rendered on the top of the list of breadcrumb trails as the most recently accessed breadcrumb trail (e.g., current breadcrumb trail), followed by "Home>Page A>Page B," as the previously accessed breadcrumb trail. In one embodiment, each higher-level page in the "Home>Page X>Page C" breadcrumb trail (e.g., relative to the current page C) may include a navigable hyperlink (e.g., indicated by the underlined page name) but the current page C may not include a navigable hyperlink. In one embodiment, the previously accessed breadcrumb trail "Home>Page A>Page B" may be brought down in the list of breadcrumb trails and Page B may be provided with a navigable hyperlink to enable navigating back to Page B. In one embodiment, Page B may be indicated as the previously accessed page (e.g., using bold font or another suitable indicator).

According to one embodiment as illustrated in FIG. 3B, in state 308 (Table 4), a user may navigate to a Page D in the application using the UI software. In one example, Page D may represent another IA node in the same page location path (relative to Page C) of the corresponding IA. An exemplary placement of the IA node associated with Page D in the IA hierarchy is illustrated in column 2 of Table 4. In one embodiment, the data navigation program 150 may capture the same page location path of Page D and may add Page D to the same breadcrumb trail from state 306: "Home>Page X>Page C>Page D". In one embodiment, the UI software may display "Home>Page X>Page C>Page D" as the visible breadcrumb trail in a corresponding display page (column 3, Table 4). In one embodiment, the list of breadcrumb trails in the historical breadcrumb control may display two breadcrumb trails, where "Home>Page X>Page C>Page D" may be rendered on the top of the list of breadcrumb trails as the most recently accessed breadcrumb trail (e.g., current breadcrumb trail), followed by "Home>Page A>Page B," as the previously accessed breadcrumb trail. In one embodiment, each higher-level page in the "Home>Page X>Page C>Page D" breadcrumb trail (e.g., relative to the current page D) may include a navigable hyperlink (e.g., indicated by the underlined page name) but the current page D may not include a navigable hyperlink.

Figure 3C:
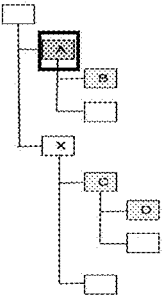
FIG. 3C is a schematic block diagram of a third set of exemplary data navigation states implemented by the data navigation environment according to at least one embodiment.
Figure 3C:
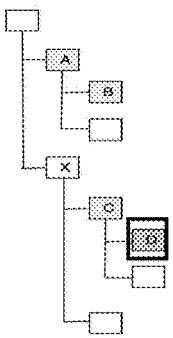

According to one embodiment as illustrated in FIG. 3C, in state 310 (Table 5), a user may return to Page A in the application using the UI software. In one example, the user may return to Page A by clicking on Page A in the "Home>Page A>Page B" breadcrumb trail in the list of breadcrumb trails of the historical breadcrumb control. In one embodiment, the UI software may display a shorter breadcrumb trail "Home>Page A" as the visible breadcrumb trail in a corresponding display page (column 3, Table 5). In one embodiment, the list of breadcrumb trails in the historical breadcrumb control may render the original breadcrumb trail "Home>Page A>Page B" including Page A at the top of the list of breadcrumb trails as the most recently accessed breadcrumb trail (e.g., current breadcrumb trail). In one embodiment, the Page A may not include a navigable link because the user is currently on Page A. In one embodiment, the breadcrumb trail that was previously on top of the list of breadcrumb trails "Home>Page X>Page C>Page D" may be moved below the current breadcrumb trail "Home>Page A>Page B".

According to one embodiment as illustrated in FIG. 3C, in state 312 (Table 6), a user may return to Page D in the application using the UI software. In one example, the user may return to Page D by clicking on Page D in the "Home>Page X>Page C>Page D" breadcrumb trail in the list of breadcrumb trails of the historical breadcrumb control. In one embodiment, the UI software may display "Home>Page X>Page C>Page D" as the visible breadcrumb trail in a corresponding display page (column 3, Table 6). In one embodiment, the list of breadcrumb trails in the historical breadcrumb control may dynamically move "Home>Page X>Page C>Page D" to the top of the list of breadcrumb trails as the most recently accessed breadcrumb trail (e.g., current breadcrumb trail), and may move the breadcrumb trail "Home>Page A>Page B" to a second position on the list of breadcrumb trails as the previously accessed breadcrumb trail. In one embodiment, the Page A may include a navigable link again because the user is not on Page A. In one embodiment, the Page D may not include a navigable link because the user is currently on Page D.

Figure 3D:
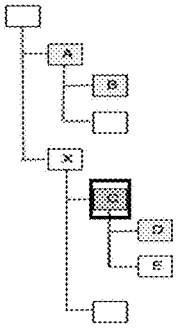
FIG. 3D is a schematic block diagram of a fourth set of exemplary data navigation states implemented by the data navigation environment according to at least one embodiment.
Figure 3D:
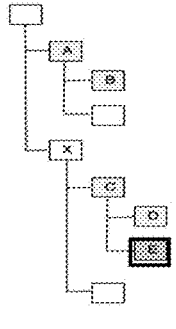

According to one embodiment as illustrated in FIG. 3D, in state 314 (Table 7), a user may return to Page C in the application using the UI software. In one example, the user may return to Page C by clicking on Page C in the "Home>Page X>Page C>Page D" breadcrumb trail in the list of breadcrumb trails of the historical breadcrumb control. In one embodiment, the UI software may display a shorter breadcrumb trail "Home>Page X>Page C" as the visible breadcrumb trail in a corresponding display page (column 3, Table 7). In one embodiment, the list of breadcrumb trails in the historical breadcrumb control may render the original breadcrumb trail "Home>Page X>Page C>Page D" including Page C at the top of the list of breadcrumb trails as the most recently accessed breadcrumb trail (e.g., current breadcrumb trail). In one embodiment, the list of breadcrumb trails may maintain the breadcrumb trail "Home>Page A>Page B" in the second position on the list of breadcrumb trails as the previously accessed breadcrumb trail. In one embodiment, the Page D may include a navigable link again because the user is not on Page D. In one embodiment, the Page C may not include a navigable link because the user is currently on Page C.

According to one embodiment as illustrated in FIG. 3D, in state 316 (Table 8), a user may navigate to a Page E in the application using the UI software. In one example, Page E may represent an IA node in a different page location path (relative to Page D) of the corresponding IA. An exemplary placement of the IA node associated with Page E in the IA hierarchy is illustrated in column 2 of Table 8. In one embodiment, the data navigation program 150 may capture the new page location path of Page E and render the new page location path as a new breadcrumb trail "Home>Page X>Page C>Page E". In one embodiment, the UI software may display "Home>Page X>Page C>Page E" as a visible breadcrumb trail in a corresponding display page (column 3, Table 8). In one embodiment, the list of breadcrumb trails in the historical breadcrumb control may display three breadcrumb trails, where "Home>Page X>Page C>Page E" may be rendered on the top of the list of breadcrumb trails as the most recently accessed breadcrumb trail (e.g., current breadcrumb trail), followed by "Home>Page X>Page C>Page D" and "Home>Page A>Page B," as the previously accessed breadcrumb trails. In one embodiment, each higher-level page in the "Home>Page X>Page C>Page E"

breadcrumb trail (e.g., relative to the current page E) may include a navigable hyperlink (e.g., indicated by the underlined page name) but the current page E may not include a navigable hyperlink. In one embodiment, the previously accessed breadcrumb trails "Home>Page X>Page C>Page D" and "Home>Page A>Page B" may be brought down in the list of breadcrumb trails and Page C may be provided with a navigable hyperlink to enable navigating back to Page C.

Figure 4:
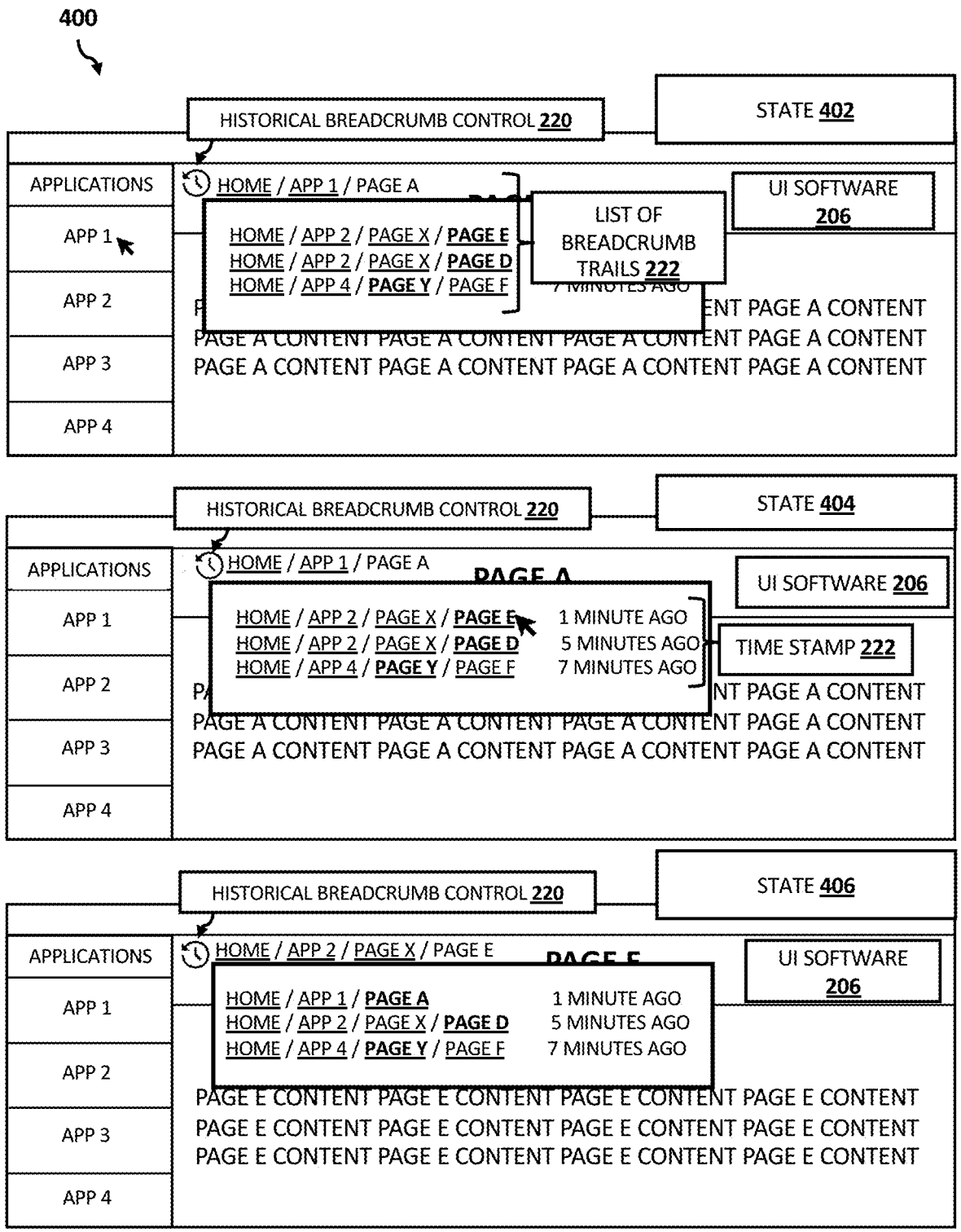
FIG. 4 is a schematic block diagram of an exemplary data navigation states for cross-IA navigation implemented by the data navigation environment according to at least one embodiment.

Referring now to FIGS. 4, a schematic block diagram of exemplary data navigation states 400 for cross-IA navigation implemented by the data navigation environment 200 (FIG. 2) according to at least one embodiment is depicted.

According to one embodiment, in state 402, the data navigation program 150 may detect a first application selected (e.g., "APP 1") by the user in the UI software 206. In one embodiment, the detected first application may include a first IA. In one embodiment, the data navigation program 150 may detect a first page (e.g., Page A) selected by the user in the first application, where the detected first page may include a first page location path in the first IA. In one embodiment, the data navigation program 150 may render a first breadcrumb trail "Home/APP 1/Page A" as a visible breadcrumb trail in a corresponding display page of the UI software 206. In one embodiment, the data navigation program 150 may add the detected first page to the rendered first breadcrumb trail in the rendered list of breadcrumb trials. In one embodiment, the first breadcrumb trail "Home/APP 1/Page A" (e.g., visible breadcrumb trail) may be rendered in a top position of the list of breadcrumb trails 222 of the historical breadcrumb control 220. In one embodiment, the list of breadcrumb trails 222 may list previously accessed breadcrumb trails in different applications in temporal order (e.g., "HOME/APP 2/PAGE X/PAGE E"; "HOME/APP 2/PAGE X/PAGE D"; "HOME/APP 4/PAGE Y/PAGE F"). In one embodiment, the previously visited pages in each previously accessed breadcrumb trail may be indicated (e.g., using bold font or another suitable indicator).

According to one embodiment, as illustrated in state 404, the list of breadcrumb trails may include a time stamp 408 associated with each previously accessed breadcrumb trail to indicate when the previously accessed breadcrumb trail was last accessed. In state 404, the data navigation program 150 may detect a second application selected (e.g., "APP 2") by the user in the UI software 206. In one embodiment, the detected second application may include a second IA that is different from the first IA. In one embodiment, the data navigation program 150 may detect a second page (e.g., Page E) selected by the user in the rendered second breadcrumb trail (e.g., "HOME/APP 2/PAGE X/PAGE E") associated with the second IA. In one embodiment, the user selecting Page E may transition the UI software 206 from state 404 to state 406 as illustrated in FIG. 4. As shown in state 406, the data navigation program 150 may move the rendered second breadcrumb trail from the lower position of the rendered list of breadcrumb trails to the top position of the rendered list of breadcrumb trails as the most recently accessed breadcrumb trail (e.g., "HOME/APP 2/PAGE X/PAGE E") and remove the navigable hyperlink from Page E. In one embodiment, the data navigation program 150 may also move the rendered first breadcrumb trail associated with the first IA from the top position of the rendered list of breadcrumb trails to the lower position of the rendered list of breadcrumb trails as the previously accessed breadcrumb trail (e.g., "Home/APP 1/Page A") and add the navigable hyperlink to Page A.

Figure 5:
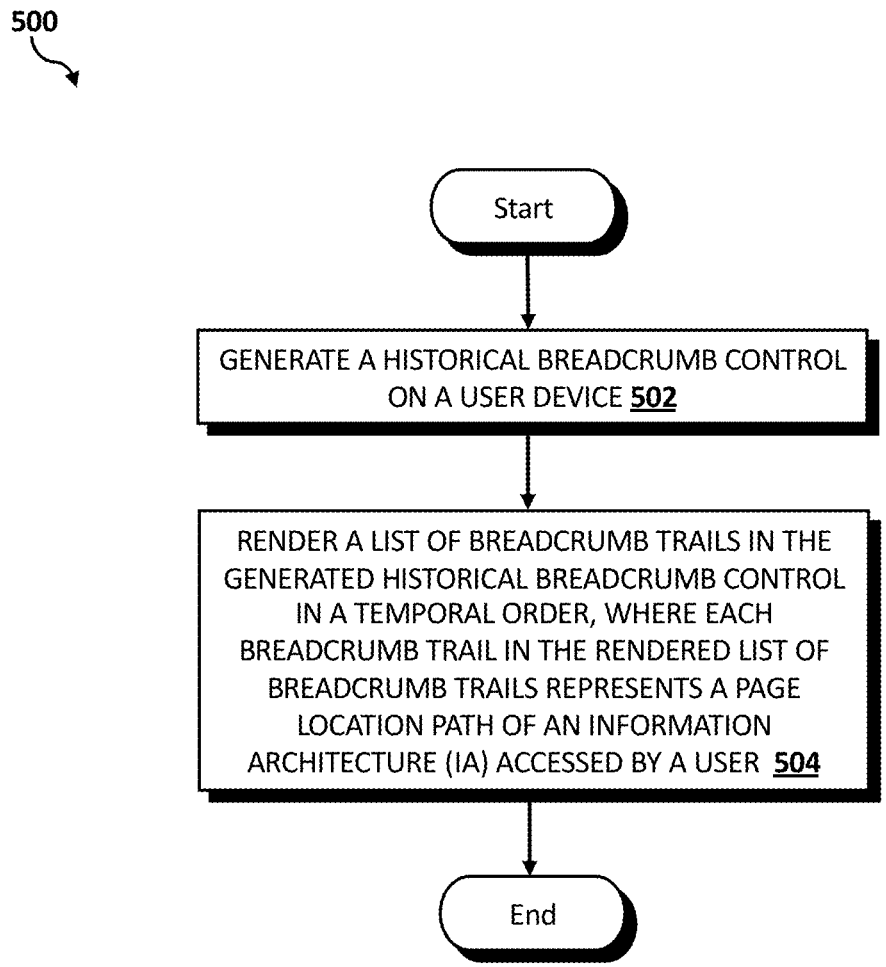
FIG. 5 is an operational flowchart illustrating a process for data navigation according to at least one embodiment.

Referring now to FIG. 5, an operational flowchart illustrating an exemplary process 500 used by the data navigation program 150 according to at least one embodiment is depicted. FIG. 5 provides a description of process 500 with reference to the data navigation environment 200 (FIG. 2).

At 502, a historical breadcrumb control is displayed on a user device. According to one embodiment, the data navigation program 150 may display a historical breadcrumb control as a UI element in one or more display pages of the UI software. In one embodiment, the historical breadcrumb control may enable the user to navigate between different applications and the corresponding IAs and return to previously visited pages.

Then at 504, a list of breadcrumb trails is rendered in the displayed historical breadcrumb control in a temporal order, where each breadcrumb trail in the rendered list of breadcrumb trails represents a page location path of an IA accessed by a user. In one embodiment, the data navigation program 150 may render a list of breadcrumb trails in the historical breadcrumb control based on the user's navigation history of one or more applications using the UI software.

According to one embodiment, the data navigation program 150 may provide in the rendered list of breadcrumb trails, a most recently accessed breadcrumb trail. In one embodiment, the data navigation program 150 may include a currently accessed page without a corresponding navigable hyperlink in the most recently accessed breadcrumb trail.

According to one embodiment, the data navigation program 150 may include at least one previously accessed breadcrumb trail below a most recently accessed breadcrumb trail in the rendered list of breadcrumb trails includes. In one embodiment, each page in the at least one previously accessed breadcrumb trail may include a corresponding navigable hyperlink.

According to one embodiment, the data navigation program 150 may detect a page selection from a previously accessed breadcrumb trail in the rendered list of breadcrumb trails. Then, the data navigation program 150 may move the previously accessed breadcrumb trail from a previous position in the rendered list of breadcrumb trails to a top position in rendered list of breadcrumb trails as a most recently accessed breadcrumb trail.

According to one embodiment, the data navigation program 150 may detect a first page selected by the user, where the detected first page includes a first page location path in the IA. Then, the data navigation program 150 may render the first page location path as a first breadcrumb trail of the rendered list of breadcrumb trails in the displayed historical breadcrumb control. In one embodiment, the data navigation program 150 may list the first breadcrumb trail in a top position of the rendered list of breadcrumb trails as the most recently accessed breadcrumb trail.

According to one embodiment, the data navigation program 150 may provide the detected first page in the first breadcrumb trail listed as the most recently accessed breadcrumb trail. In one embodiment, the detected first page may not include a corresponding navigable hyperlink.

According to one embodiment, the data navigation program 150 may detect another page selected by the user, where the detected another page includes a higher-level page relative to the detected first page in the first page location path. In one embodiment, the data navigation program 150 may maintain the first breadcrumb trail as the most recently accessed breadcrumb trail in the rendered list of breadcrumb trails. In one embodiment, the data navigation program 150 may render the detected another page and the detected first page in a single breadcrumb trail. In one embodiment, the data navigation program 150 may remove the corresponding navigable hyperlink from the detected another page in the maintained first breadcrumb trail, where the detected another page represents a currently accessed page. In one embodiment, the data navigation program 150 may insert the corresponding navigable hyperlink in the detected first page in the maintained first breadcrumb trail.

According to one embodiment, the data navigation program 150 may detect another page selected by the user, where the detected another page includes a higher-level page relative to the detected first page in the first page location path. In one embodiment, the data navigation program 150 may render a shorter version of the first breadcrumb trail in the top position of the rendered list of breadcrumb trails as the most recently accessed breadcrumb trail. In one embodiment, the shorter version of the first breadcrumb trail may not include the detected first page. In one embodiment, the shorter version of the first breadcrumb trail may include the detected another page without the corresponding navigable hyperlink. In one embodiment, the data navigation program 150 may move the first breadcrumb trail from the top position of the rendered list of breadcrumb trails to a lower position in the rendered list of breadcrumb trails as a previously accessed breadcrumb trail, where the detected first page in the first breadcrumb trail may include the corresponding navigable hyperlink.

According to one embodiment, the data navigation program 150 may detect another page selected by the user, where the detected another page is not in the first page location path of the IA. In one embodiment, the data navigation program 150 may determine a second page location path of the detected another page. In one embodiment, the data navigation program 150 may render the determined second page location path as a second breadcrumb trail in the rendered list of breadcrumb trails. In one embodiment, the data navigation program 150 may list the second breadcrumb trail in the top position in the rendered list of breadcrumb trails as the most recently accessed breadcrumb trail. In one embodiment, the data navigation program 150 may move the first breadcrumb trail from the top position of the rendered list of breadcrumb trails to a lower position of the rendered list of breadcrumb trails as a previously accessed breadcrumb trail.

According to one embodiment, the data navigation program 150 may detect a first application selected by the user in a UI software, where the detected first application may include a first IA. In one embodiment, the data navigation program 150 may render a first breadcrumb trail in the rendered list of breadcrumb trails associated with the first IA. In one embodiment, the data navigation program 150 may detect a second application selected by the user in the UI software, where the detected second application may include a second IA that is different from the first IA. In one embodiment, the data navigation program 150 may render a second breadcrumb trail in the rendered list of breadcrumb trails associated with the second IA, where the rendered second breadcrumb trail may be rendered in a top position of the rendered list of breadcrumb trails as a most recently accessed breadcrumb trail, and where the rendered first breadcrumb trail may be moved to a lower position of the rendered list of breadcrumb trails as a previously accessed breadcrumb trail.

According to one embodiment, the data navigation program 150 may detect a first page selected by the user in the first application, where the detected first page may include a first page location path in the first IA. In one embodiment, the data navigation program 150 may add the detected first page to the rendered first breadcrumb trail in the rendered list of breadcrumb trials, where the rendered first breadcrumb trail may be associated with the first page location path. In one embodiment, the data navigation program 150 may move the rendered first breadcrumb trail from the lower position of the rendered list of breadcrumb trails to that top position of the rendered list of breadcrumb trails as the most recently accessed breadcrumb trail. In one embodiment, the data navigation program 150 may move the rendered second breadcrumb trail associated with the second IA from the top position of the rendered list of breadcrumb trails to the lower position of the rendered list of breadcrumb trails as the previously accessed breadcrumb trail.

According to one embodiment, the data navigation program 150 may detect a second page selected by the user in the rendered second breadcrumb trail associated with the second IA. In one embodiment, the data navigation program 150 may move the rendered second breadcrumb trail from the lower position of the rendered list of breadcrumb trails to the top position of the rendered list of breadcrumb trails as the most recently accessed breadcrumb trail. In one embodiment, the data navigation program 150 may move the rendered first breadcrumb trail associated with the first IA from the top position of the rendered list of breadcrumb trails to the lower position of the rendered list of breadcrumb trails as the previously accessed breadcrumb trail.

It is contemplated that the data navigation program 150 may provide several advantages and/or improvements to the technical field of GUI navigation. The data navigation program 150 may also improve the functionality of a computer because the data navigation program 150 may enable the computer to keep the IA of a visited page intact in the shape of a breadcrumb, and show a recent list of visited IA breadcrumbs to reflect the historical paths a user took across multiple IA hierarchies (e.g., multiple applications). The data navigation program 150 may enable a computer to provide a compact GUI to navigate the IA and history at the same time across multiple products (e.g., applications).

It may be appreciated that FIGS. 2 to 8 provide only an illustration of one embodiment and do not imply any limitations with regard to how different embodiments may be implemented. Many modifications to the depicted embodiment(s) may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating a historical breadcrumb control on a user device, wherein the generated historical breadcrumb control includes a list of breadcrumb trails rendered in a temporal order, wherein each breadcrumb trail in the list of breadcrumb trails is configured to represent a page location path of an information architecture (IA) accessed by a user;

detecting a first page accessed by the user, wherein the detected first page includes a first page location path in the IA; and rendering the first page location path as a first breadcrumb trail of the list of breadcrumb trails in the generated historical breadcrumb control, wherein the first breadcrumb trail is listed in a top position of the list of breadcrumb trails as the most recently accessed breadcrumb trail.

2. The method of claim 1, further comprising:

detecting a page selection from a previously accessed breadcrumb trail in the list of breadcrumb trails; and moving the previously accessed breadcrumb trail from a previous position in the list of breadcrumb trails to a top position in the list of breadcrumb trails as a most recently accessed breadcrumb trail.

3. The method of claim 1, wherein the list of breadcrumb trails includes at least one previously accessed breadcrumb trail below the most recently accessed breadcrumb trail, and wherein each page in the at least one previously accessed breadcrumb trail includes a corresponding navigable hyperlink.

4. The method of claim 1, wherein the first breadcrumb trail listed as the most recently accessed breadcrumb trail includes the detected first page without a corresponding navigable hyperlink.

5. The method of claim 4, further comprising:

detecting another page selected by the user, wherein the detected another page includes a higher-level page relative to the detected first page in the first page location path;

maintaining the first breadcrumb trail as the most recently accessed breadcrumb trail in the list of breadcrumb trails, wherein the detected another page and the detected first page are rendered in a single breadcrumb trail;

removing the corresponding navigable hyperlink from the detected another page in the maintained first breadcrumb trail, wherein the detected another page represents a currently accessed page; and inserting the corresponding navigable hyperlink in the detected first page in the maintained first breadcrumb trail.

6. The method of claim 4, further comprising:

detecting another page selected by the user, wherein the detected another page includes a higher-level page relative to the detected first page in the first page location path;

rendering a shorter version of the first breadcrumb trail in the top position of the list of breadcrumb trails as the most recently accessed breadcrumb trail, wherein the shorter version of the first breadcrumb trail does not include the detected first page, and wherein the shorter version of the first breadcrumb trail includes the detected another page without the corresponding navigable hyperlink; and moving the first breadcrumb trail from the top position of the list of breadcrumb trails to a lower position in the list of breadcrumb trails as a previously accessed breadcrumb trail, wherein the detected first page in the first breadcrumb trail includes the corresponding navigable hyperlink.

7. The method of claim 1, further comprising:

detecting another page selected by the user, wherein the detected another page is not in the first page location path of the IA;

determining a second page location path of the detected another page;

rendering the determined second page location path as a second breadcrumb trail in the list of breadcrumb trails, wherein the second breadcrumb trail is listed in the top position in the list of breadcrumb trails as the most recently accessed breadcrumb trail; and moving the first breadcrumb trail from the top position of the list of breadcrumb trails to a lower position of the list of breadcrumb trails as a previously accessed breadcrumb trail.

8. The method of claim 1, further comprising:

detecting a first application selected by the user in a user interface (UI) software, wherein the detected first application includes a first application IA;

rendering a first application breadcrumb trail in the list of breadcrumb trails associated with the first IA;

detecting a second application selected by the user in the UI software, wherein the detected second application includes a second application IA that is different from the first application IA; and rendering a second application breadcrumb trail in the list of breadcrumb trails associated with the second application IA, wherein the rendered second application breadcrumb trail is rendered in a top position of the list of breadcrumb trails as the most recently accessed breadcrumb trail, and wherein the rendered first application breadcrumb trail is moved to a lower position of the list of breadcrumb trails as a previously accessed breadcrumb trail.

9. The method of claim 8, further comprising:

detecting a first application page selected by the user in the first application, wherein the detected first application page includes a first application page location path in the first application IA;

adding the detected first application page to the rendered first application breadcrumb trail in the list of breadcrumb trails, wherein the rendered first application breadcrumb trail is associated with the first application page location path;

moving the rendered first application breadcrumb trail from the lower position of the list of breadcrumb trails to the top position of the list of breadcrumb trails as the most recently accessed breadcrumb trail; and moving the rendered second application breadcrumb trail associated with the second application IA from the top position of the list of breadcrumb trails to the lower position of the list of breadcrumb trails as the previously accessed breadcrumb trail.

10. The method of claim 9, further comprising:

detecting a second application page selected by the user in the rendered second application breadcrumb trail associated with the second application IA;

moving the rendered second application breadcrumb trail from the lower position of the list of breadcrumb trails to the top position of the list of breadcrumb trails as the most recently accessed breadcrumb trail; and moving the rendered first application breadcrumb trail associated with the first application IA from the top position of the list of breadcrumb trails to the lower position of the list of breadcrumb trails as the previously accessed breadcrumb trail.

11. A computer system for a cross-IA historical breadcrumb control, comprising:

one or more processors, one or more computer-readable memories, one or more computer- readable tangible storage media, and program instructions stored on at least one of the one or more computer-readable tangible storage media for execution by at least one of the one or more processors via at least one of the one or more memories, wherein the computer system is capable of performing a method comprising:
generating a historical breadcrumb control on a user device, wherein the generated historical breadcrumb control includes a list of breadcrumb trails rendered in a temporal order, wherein each breadcrumb trail in the list of breadcrumb trails is configured to represent a page location path of an information architecture (IA) accessed by a user;
detecting a first page accessed by the user, wherein the detected first page includes a first page location path in the IA; and
rendering the first page location path as a first breadcrumb trail of the list of breadcrumb trails in the generated historical breadcrumb control, wherein the first breadcrumb trail is listed in a top position of the list of breadcrumb trails as the most recently accessed breadcrumb trail.

12. The computer system of claim 11, further comprising:
detecting a page selection from a previously accessed breadcrumb trail in the list of breadcrumb trails; and
moving the previously accessed breadcrumb trail from a previous position in the list of breadcrumb trails to a top position in the list of breadcrumb trails as a most recently accessed breadcrumb trail.

13. The computer system of claim 11, wherein the list of breadcrumb trails includes at least one previously accessed breadcrumb trail below the most recently accessed breadcrumb trail, and wherein each page in the at least one previously accessed breadcrumb trail includes a corresponding navigable hyperlink.

14. The computer system of claim 11, further comprising:
detecting a first application selected by the user in a user interface (UI) software, wherein the detected first application includes a first application IA;
rendering a first application breadcrumb trail in the list of breadcrumb trails associated with the first IA;
detecting a second application selected by the user in the UI software, wherein the detected second application includes a second application IA that is different from the first application IA; and
rendering a second application breadcrumb trail in the list of breadcrumb trails associated with the second application IA, wherein the rendered second application breadcrumb trail is rendered in a top position of the list of breadcrumb trails as the most recently accessed breadcrumb trail, and wherein the rendered first application breadcrumb trail is moved to a lower position of the list of breadcrumb trails as a previously accessed breadcrumb trail.

15. The computer system of claim 14, further comprising:
detecting a first application page selected by the user in the first application, wherein the detected first application page includes a first application page location path in the first application IA;
adding the detected first application page to the rendered first application breadcrumb trail in the list of breadcrumb trails, wherein the rendered first application breadcrumb trail is associated with the first application page location path;
moving the rendered first application breadcrumb trail from the lower position of the list of breadcrumb trails to the top position of the list of breadcrumb trails as the most recently accessed breadcrumb trail; and
moving the rendered second application breadcrumb trail associated with the second application IA from the top position of the list of breadcrumb trails to the lower position of the list of breadcrumb trails as the previously accessed breadcrumb trail.

16. A computer program product for a cross-IA historical breadcrumb control, comprising:
one or more computer-readable storage media and program instructions collectively stored on the one or more computer-readable storage media, the program instructions executable by a processor to cause the processor to perform a method comprising:
generating a historical breadcrumb control on a user device, wherein the generated historical breadcrumb control includes a list of breadcrumb trails rendered in a temporal order, wherein each breadcrumb trail in the list of breadcrumb trails is configured to represent a page location path of an information architecture (IA) accessed by a user;
detecting a first page accessed by the user, wherein the detected first page includes a first page location path in the IA; and
rendering the first page location path as a first breadcrumb trail of the list of breadcrumb trails in the generated historical breadcrumb control, wherein the first breadcrumb trail is listed in a top position of the list of breadcrumb trails as the most recently accessed breadcrumb trail.

\* \* \* \* \*